(12) United States Patent
Uchiho et al.

(10) Patent No.: US 12,516,364 B2
(45) Date of Patent: Jan. 6, 2026

(54) DEVICE FOR TESTING BACTERIUM, AND METHOD FOR TESTING BACTERIUM

(71) Applicant: Hitachi High-Tech Corporation, Tokyo (JP)

(72) Inventors: Yuichi Uchiho, Tokyo (JP); Chihiro Uematsu, Tokyo (JP); Tetsushi Koide, Hiroshima (JP)

(73) Assignee: HITACHI HIGH-TECH CORPORATION

( * ) Notice: Subject to any disclaimer, the term of this patent is extended or adjusted under 35 U.S.C. 154(b) by 1030 days.

(21) Appl. No.: 16/980,739

(22) PCT Filed: Jan. 24, 2019

(86) PCT No.: PCT/JP2019/002165
§ 371 (c)(1),
(2) Date: Sep. 14, 2020

(87) PCT Pub. No.: WO2019/193815
PCT Pub. Date: Oct. 10, 2019

(65) Prior Publication Data
US 2021/0010054 A1   Jan. 14, 2021

(30) Foreign Application Priority Data

Apr. 4, 2018   (JP) ................. 2018-072303

(51) Int. Cl.
*C12Q 1/18* (2006.01)
*G01N 21/17* (2006.01)

(52) U.S. Cl.
CPC .............. *C12Q 1/18* (2013.01); *G01N 21/17* (2013.01)

(58) Field of Classification Search
CPC ........... C12M 41/36; C12M 1/34; C12Q 1/18; G01N 15/1475; G01N 2015/1006;
(Continued)

(56) References Cited

U.S. PATENT DOCUMENTS

| 5,629,169 A | 5/1997 | Izraelevitz et al. |
| 6,096,272 A * | 8/2000 | Clark .................... G01N 21/253 422/67 |
| 6,251,624 B1 * | 6/2001 | Matsumura .......... G01N 21/253 435/31 |

(Continued)

FOREIGN PATENT DOCUMENTS

| JP | 08-287261 A | 11/1996 |
| JP | 2015-177768 A | 10/2015 |

(Continued)

OTHER PUBLICATIONS

Extended European Search Report dated Dec. 3, 2021 from counterpart EP Patent Application No. 19782309.9, 9 pages.

(Continued)

*Primary Examiner* — Michael L Hobbs
(74) *Attorney, Agent, or Firm* — Procopio, Cory, Hargreaves & Savitch LLP

(57) ABSTRACT

A bacteria test apparatus that identifies bacteria and conducts an antibacterial susceptibility test includes a microscope optical system which captures for each of a plurality of wells holding a culture solution containing an antibacterial drug and the bacteria undergoing the antibacterial susceptibility test, a plurality of images of the well including the bacteria at a plurality of time points, a display device which displays a determination result output based on a calculation of, for each of the plurality of wells, a feature of luminance value for each of the images, and for the each of the plurality of wells, a determination of whether growth of the bacteria has occurred in the plurality of wells based on a temporal change in the feature of luminance value.

8 Claims, 11 Drawing Sheets

(58) Field of Classification Search
CPC ........... G01N 2021/5957; G01N 21/17; G01N 21/51; G01N 2201/122; G06T 2207/10056; G06T 2207/30024; G06T 2207/30072; G06T 2207/30242; G06T 2207/30168; G06T 7/0012
See application file for complete search history.

(56) References Cited

U.S. PATENT DOCUMENTS

| | | | |
|---|---|---|---|
| 2003/0170613 A1* | 9/2003 | Straus | G01N 21/6428 435/5 |
| 2005/0207633 A1* | 9/2005 | Arini | G01N 21/6452 382/133 |
| 2016/0058717 A1* | 3/2016 | Page | A61K 9/0053 514/632 |
| 2017/0096631 A1 | 4/2017 | Uematsu et al. | |
| 2018/0010084 A1 | 1/2018 | Jematsu et al. | |

FOREIGN PATENT DOCUMENTS

| | | | |
|---|---|---|---|
| JP | 2015-181374 A | | 10/2015 |
| JP | 2018033430 A | | 3/2018 |
| KR | 20170018346 A | * | 2/2017 |
| WO | 2014/171381 A1 | | 10/2014 |
| WO | 2016/121627 A1 | | 8/2016 |

OTHER PUBLICATIONS

Bray et al., "Workflow and Metrics for Image Quality Control in Large-Scale High-Content Screens" Journal of Biomolecular Screening (2011) 17(2):266-274.

International Search Report and Written Opinion for related International Application No. PCT/JP2019/002165, mailed on Apr. 23, 2019; English translation of ISR provided (11 pages).

Office Action dated Oct. 26, 2021 from corresponding JP Patent Application No. 2018-072303, 6 pages.

* cited by examiner

DEVICE FOR TESTING BACTERIUM, AND METHOD FOR TESTING BACTERIUM

TECHNICAL FIELD

The present disclosure relates to a bacteria test apparatus and a bacteria test method.

BACKGROUND ART

In recent years, the percentage of drug resistant bacteria has increased due to abuse of antibiotics for patients with infectious diseases, and the number of hospital-acquired infections is on the increase accordingly. However, the development of new antibiotics is on the decrease year by year due to the decline in profitability. Therefore, it is extremely important to conduct, when an infectious disease occurs, a bacterial species identification test and an antibacterial susceptibility test on causative bacteria, and to properly use antibiotics to ensure early recovery of patients, prevention of hospital-acquired infections, and prevention of emergence of drug resistant bacteria.

Under a test method that is typically practiced in a bacteria test room in a hospital, infection-causative bacteria are cultured, and then the identification of a bacterial species and the determination of antibacterial susceptibility are made based on whether the growth of the infection-causative bacteria has occurred. First, a specimen such as blood, a throat swab, or sputum is collected from a patient and is subjected to an isolation culture, for twenty-four hours, for obtaining a single colony of the infection-causative bacteria. A bacterial suspension is prepared from the single colony and is subjected to an identification culture or a culture for antibacterial susceptibility test for twenty-four hours. After the culture, a degree of growth of the bacteria is determined based on turbidity, and then results of the identification of the bacterial species of the infection-causative bacteria and the antibacterial susceptibility are obtained. Therefore, for example, on the third day or later after the collection of the specimen from the patient, the determination result of the antibacterial susceptibility test is finally obtained, and an appropriate medication is made. More days are required for infection-causative bacteria that are slow in growth rate and requires a long-term culture. Until this test result is made clear, antibacterial agents that are effective against a wide range of bacterial species are often used. Therefore, there is a demand for a method capable of obtaining results of identification of the bacterial species and antibacterial susceptibility more quickly than ever before.

For example, PTL 1 discloses a method using a microscope in order to quickly obtain an antibacterial susceptibility result. Under this method, in order to detect the growth state of bacteria, a microscopic image or a feature (a change in the number of bacterial cells or morphology) obtained from the microscopic image is compared with a database containing known results.

CITATION LIST

Patent Literature

PTL 1: JP 2015-177768 A

SUMMARY OF INVENTION

Technical Problem

The method for determining the growth state of bacteria based on a microscopic image disclosed in PTL 1 includes detecting edges of bacteria, binarizing, and extracting a feature of bacteria. A threshold for binarization may vary in in accordance with the degree of growth of bacteria, and therefore the binarization is automatically made under a discriminant analysis method or the like. However, a situation where the growth of bacteria has developed and occurred over the entire image may prevent a proper setting of the threshold for binarization. This in turn prevents an accurate determination as to whether the growth of bacteria has occurred or been inhibited.

The present disclosure has been made in view of such circumstances, and provides a technique that enables an accurate determination as to whether the growth of bacteria has occurred or been inhibited.

Solution to Problem

In order to solve the above-described problems, a bacteria test apparatus according to the present disclosure includes a microscope optical system which captures images of bacteria in each of a plurality of wells at a plurality of time points, the plurality of wells each holding a culture solution containing an antibacterial drug and the bacteria, an arithmetic unit which calculates a feature of luminance value for each of the images of the bacteria, a determination unit which determines whether growth of the bacteria has occurred in the wells based on a change in the feature of luminance value, and a display device which displays a determination result output from the determination unit. The arithmetic unit calculates, as the feature of luminance value, a feature including at least one of a mean, a median, or a mode.

The other features related to the present disclosure will be apparent from the description of the present specification and the accompanying drawings. Further, aspects of the present disclosure are achieved and practiced by the elements, combinations of various elements, and the following detailed description and appended claims.

It should be understood that the description herein is given by way of typical example only and is not intended to limit the scope or claims or applications in any sense.

Advantageous Effects of Invention

The bacteria test apparatus according to the present disclosure is capable of detecting the growth of bacteria with high accuracy even when the growth of bacteria has occurred over the entire image, and an automatic binarization process causes an error in detection of bacteria due to an improper threshold setting.

DESCRIPTION OF EMBODIMENTS

Hereinafter, a description will be given of embodiments of the present invention with reference to the accompanying drawings. In the accompanying drawings, elements having the same functionality may be denoted by the same numbers. Although the accompanying drawings show specific embodiments and examples in accordance with the principles of the present invention, the drawings are given to facilitate understanding of the present invention and are not intended at all to cause the present invention to be restrictively interpreted.

Although the embodiments have been described in detail enough for those skilled in the art to carry out the present invention, it should be understood that other implementations or embodiments are also possible, and a modification to a configuration or structure, or replacement of various elements may be made without departing from the scope and spirit of the technical idea of the present invention. Therefore, the following description should not be interpreted as limiting the present invention to the embodiments.

About a Cause of Failure to Accurately Determine Whether the Growth of Bacteria has Occurred or Been Inhibited in a Test Using a Microscopic Image A method for determining the growth state of bacteria based on a microscopic image may cause a threshold for binarization to vary in accordance with a degree of the growth of bacteria, so that a situation where the growth of bacteria has developed and occurred over the entire image may prevent a proper setting of the threshold for binarization. This may make the number of detected bacteria smaller than the actual number of bacteria in the image, and the bacteria may appear to be reduced.

Figure 1:
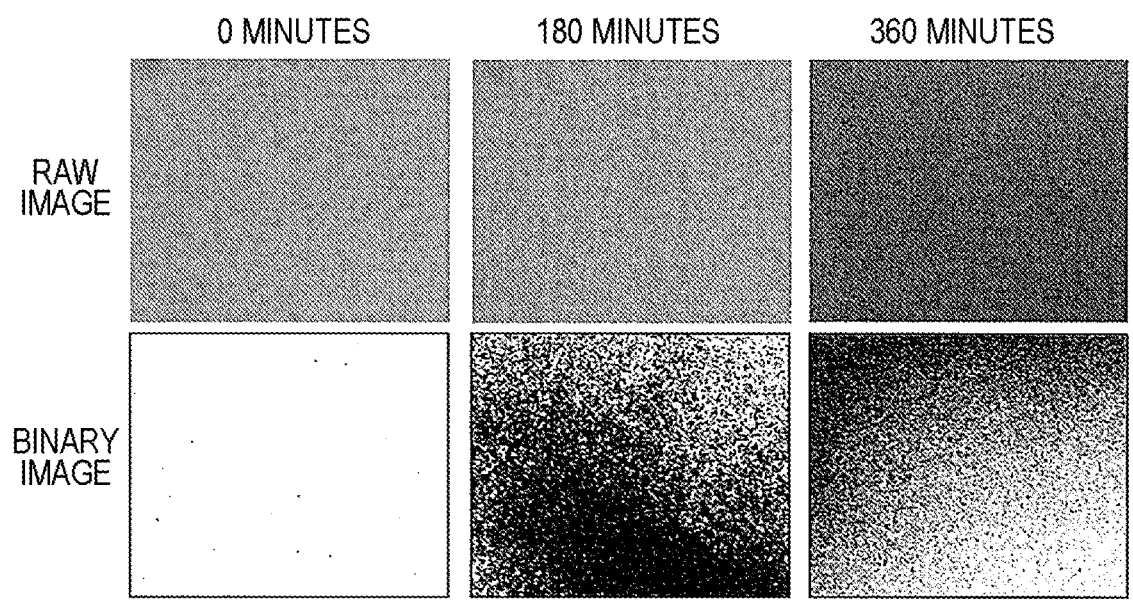
FIG. 1 is a diagram showing examples of images and an example of a growth curve when bacteria are detected through binarization based on discriminant analysis.
Figure 1:
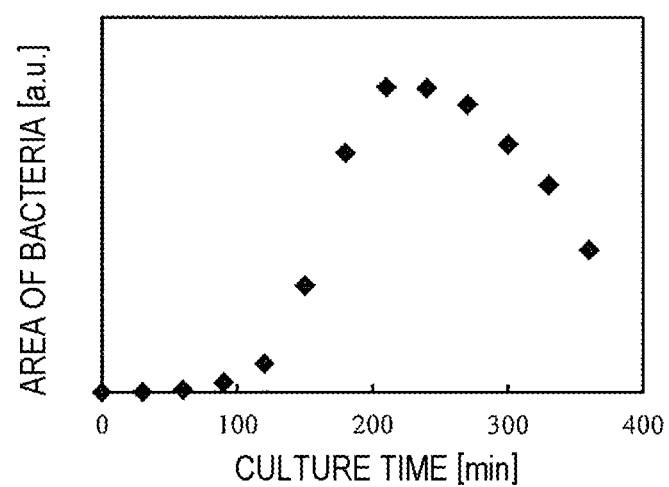

FIG. 1 is a diagram showing examples of images and an example of a growth curve when bacteria are detected through binarization based on discriminant analysis. Referring to FIG. 1, it is clear from the images that the bacteria have grown over time, but the area of the bacteria detected through binarization based on discriminant analysis continues to increase up to about 200 minutes and then starts to decrease in reversal. Such a decrease may make a determination difficult, as to whether the bacteria has decreased due to the effect of an antibacterial drug or the effect of image processing.

The present embodiments are intended to provide a proposal for improvement in such a method for determining the growth of bacteria in the related art. More specifically, disclosed is a method for determining the growth of bacteria based on a time variation in statistical feature (also referred to as a statistical evaluation value such as a mean, a median, or a mode) of luminance value of a microscopic image.

First Embodiment

The first embodiment discloses an embodiment where an image of each well of a test plate is captured, and a determination is made as to whether the growth of bacteria has occurred based on a time variation in luminance value (for example, a mean of luminance values) of the image of each well.

<Example of Structure of Bacteria Test Apparatus>

Figure 2:
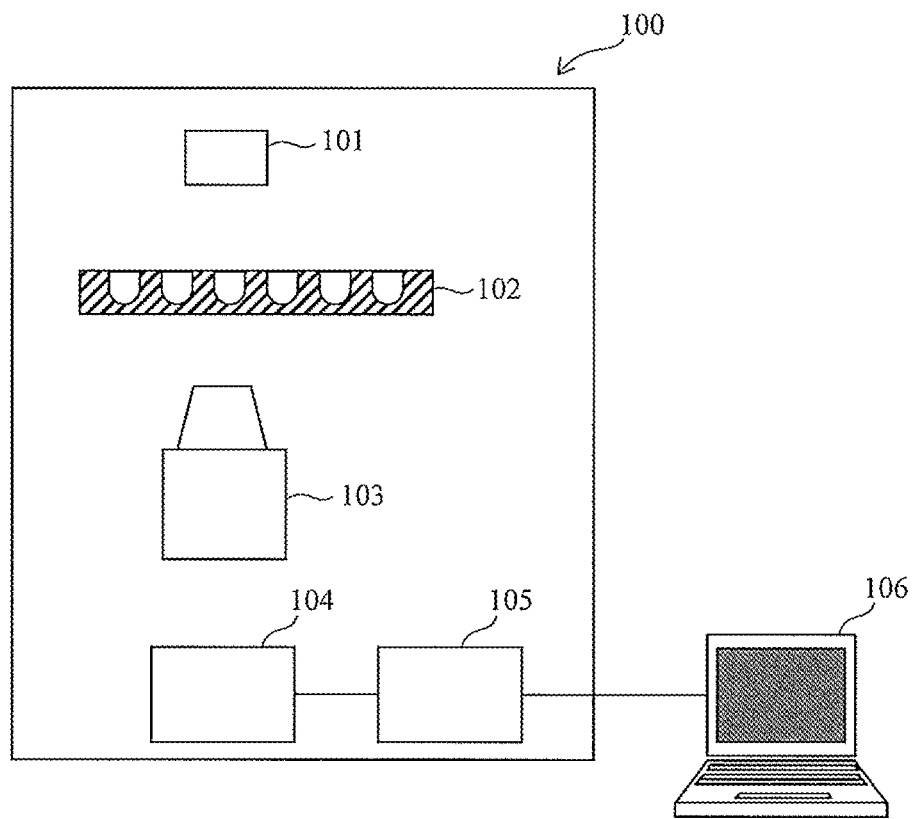
FIG. 2 is a diagram schematically showing an example of a structure of a bacteria test apparatus 100 according to embodiments (common to all embodiments) of the present disclosure.

FIG. 2 is a diagram schematically showing an example of a structure of a bacteria test apparatus 100 according to the embodiments (common to all embodiments) of the present disclosure. The bacteria test apparatus 100 includes an illuminator 101, a test plate 102, an objective lens 103, an imager 104, an image processor 105, and a controller 106.

The test plate 102 has a plurality of wells, and each well holds a medium component that facilitate the growth of bacteria and an antibacterial drug to be tested. After a bacterial solution containing the bacteria to be tested is dispensed to each well, the test plate 102 is introduced into the bacteria test apparatus 100. The bacteria test apparatus 100 is adjusted to a temperature, such as 37° C., at which the bacteria can grow.

The illuminator 101 illuminates the test plate 102 with light. As the illuminator 101, a light source of white light such as a lamp or a light source of light in a specific wavelength range such as an LED may be used. Light passing through each well of the test plate 102 is condensed by the objective lens 103 and measured as an image by the imager 104. It is desirable to focus the objective lens 103 on a bottom surface of each well of the test plate 102 so as to enable observation of the growth state of bacteria, but the image may be captured with the focus placed on the inside of a culture solution away from the bottom surface. Further, images of a plurality of points in each well may be captured, or alternatively, a plurality of images of the inside of the culture solution away from the bottom surface of each well of the test plate 102 may be measured. Such images are captured at preset time intervals, for example, every 30 minutes. The images thus captured are processed by the image processor 105 and sent to the controller 106.

The controller 106 includes, for example, a general-purpose computer and a display device, and is capable of setting a measurement condition, controlling start and stop of measurement, and making a result viewable in response to an instruction from an operator. The setting of a measurement condition includes settings of an antibacterial drug type and antibacterial drug arrangement in the test plate 102, a setting of information on a bacterial species to be tested, a setting of image measurement intervals, a setting of determination time, and the like.

<Example of Internal Structure of Image Processor>

Figure 3:
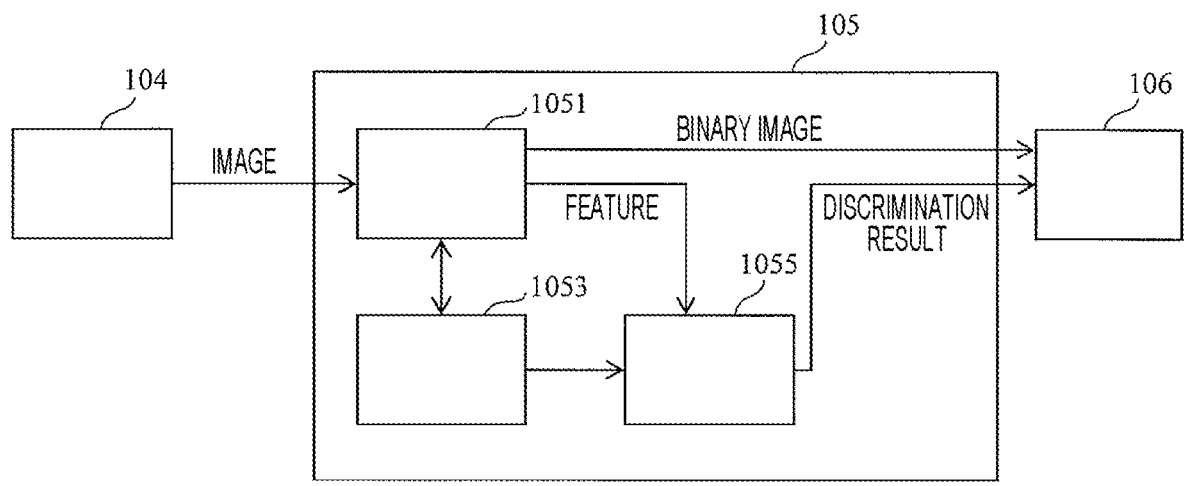
FIG. 3 is a diagram showing an example of an internal structure of an image processor 105.

FIG. 3 is a diagram showing an example of an internal structure of the image processor 105. The image processor 105 includes an arithmetic unit 1051, a storage unit 1053, and a determiner (determination unit) 1055.

The arithmetic unit 1051 processes the captured image to extract a feature. The determiner 1055 uses the feature acquired from the arithmetic unit 1051 to determine whether the antibacterial drug is ineffective and the growth of bacteria has occurred ("occurrence of growth"), or the antibacterial drug is effective and the growth of bacteria has been inhibited ("inhibition of growth").

The storage unit 1053 stores the image thus measured, the feature, and a discriminant. The discriminant is created through learning using training data containing pre-measured images, features, and results of the method according to the conventional technique. Further, the results of the method according to the conventional technique correspond to results representing that the growth has occurred or been inhibited determined with a turbidimeter after 18 to 24 hours. The discriminant is created through learning using the image measurement result and the extracted feature with the results of the method according to the conventional technique treated as "correct outputs". The discriminant is created for each type of antibacterial drug or each bacterial species. The determination may be made using training data, learned based on a bacterial species similar in growth rate or response to an antibacterial drug. Further, the discriminant may be created from a collection of training data associated with similar bacterial species.

Upon reception of the feature, the determiner 1055 determines whether the growth in the well has occurred or been inhibited based on a discriminant associated with an antibacterial drug. At this time, since the image input from the imager 104 contains information on the bacterial species and antibacterial drug, a suitable discriminant is selected from the storage unit 1053. The determination as to whether the growth has occurred or been inhibited using the image is output to the controller 106 at a preset time point, for example, 3, 6, or 18 hours after the culture. The controller 106 makes the raw image thus captured, the image subjected to image processing, the result of determination as to whether the growth has occurred or been inhibited, and the like viewable.

<Details of Processing to be Performed by Image Processor 105>

Figure 4:
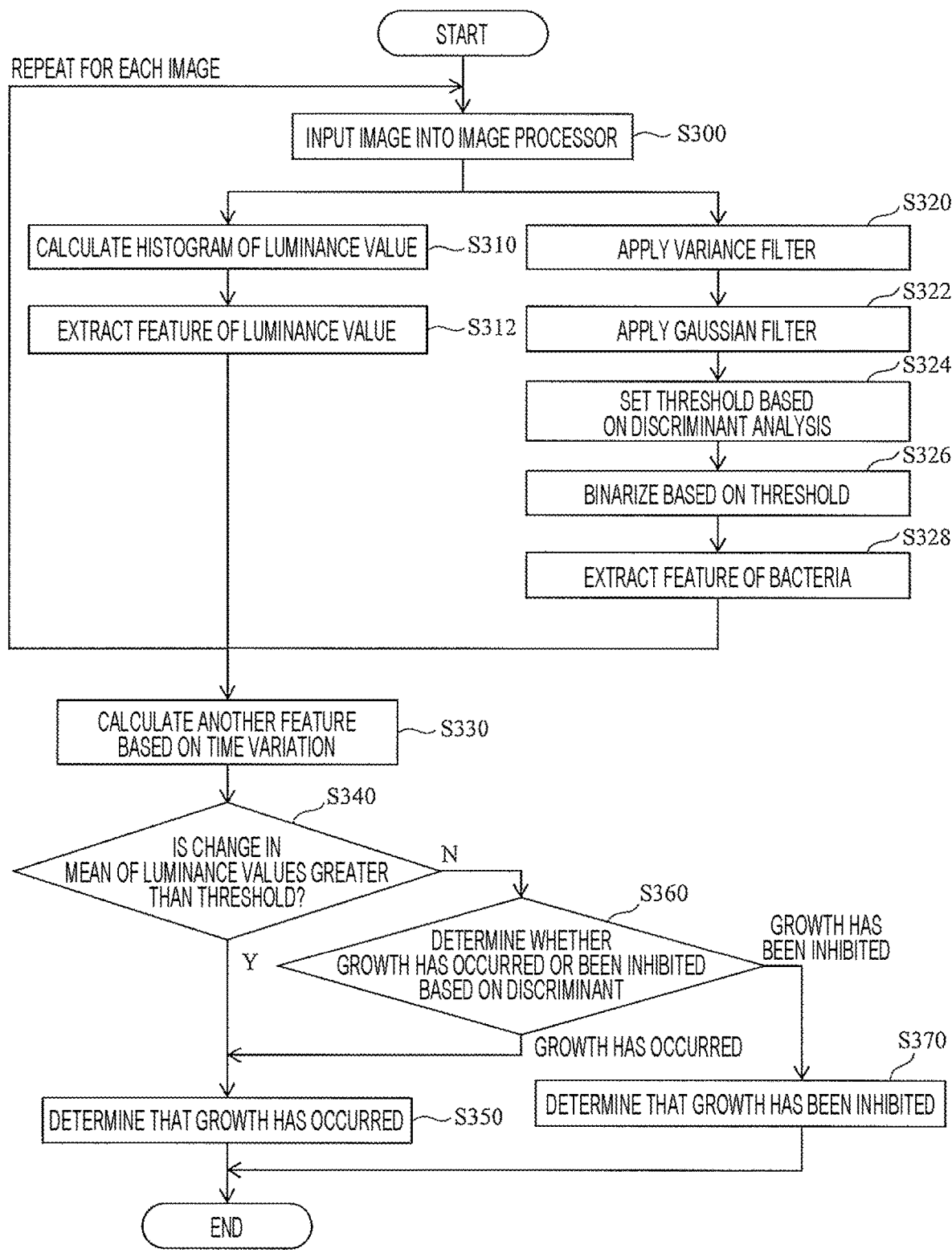
FIG. 4 is a flowchart for describing image processing and a determination as to whether the growth has occurred or been inhibited (details of processing to be performed by the image processor 105) according to a first embodiment.

FIG. 4 is a flowchart for describing the image processing, and the determination as to whether the growth has occurred or been inhibited (details of processing to be performed by the image processor 105) according to the first embodiment.

Note that, in the following description, the image is an 8-bit grayscale image where a pixel value of 0 represents black, and a pixel value of 255 represents white. This processing is valid for (applicable to) even a grayscale image other than the 8-bit grayscale image or a black-and-white inverted image. The same processing is applicable to a color image on the condition that the color image is converted to a grayscale image.

(i) Step 300

The arithmetic unit 1051 acquires the captured image from the imager 104 (S300). During the image processing performed by the arithmetic unit 1051, features are extracted by two independent image processings. One of the features corresponds to a feature based on a luminance value (statistical feature related to a luminance value of each pixel of the captured image), and the other corresponds to a feature based on a known method (feature based on a binary image). The feature extraction processes may be performed in parallel, for example.

(ii) Step 310

The arithmetic unit 1051 calculates a histogram of luminance value in the image from the luminance value of each pixel.

(iii) Step 312

The arithmetic unit 1051 calculates a feature such as a mean, a median, and a mode from the histogram of luminance value obtained in step 310 as the feature of luminance value, and stores the feature of luminance value into the storage unit 1053.

(iv) Step 320

The arithmetic unit 1051 first applies a variance filter to a target image. The application of the variance filter is a process of replacing a value of the pixel of interest with a variance of the surrounding pixels. A pixel where bacteria are present is largely different from the surrounding pixels where no bacteria are present, allowing edges of the bacteria to be detected. An edge detection technique such as a Sobel filter other than the variance filter may be used, for example.

(v) Step 322

The arithmetic unit 1051 applies a Gaussian filter to the image to which the variance filter has been applied. The application of the Gaussian filter is a process of smoothing the detected edges. Subsequently, a black-and-white inversion process is optionally performed in order to make the processed image visually clear. The black-and-white inversion causes the bacteria to appear black and causes the background to appear white.

(vi) Step 324

Subsequently, the arithmetic unit 1051 sets a black-and-white threshold for the subsequent binarization process. Since the brightness and contrast of bacteria in the image vary in a manner that depends on a bacterial species and the number of bacteria in the image, even the image of the same well may vary as the culture develops. Binarization with a fixed threshold may prevent the bacteria in the image from being sufficiently recognized and may cause an error in the number of bacteria or the like. Therefore, even for the same well, it is necessary to automatically make the determination on each image. According to the present embodiment, the threshold for binarization is set by a known method based on discriminant analysis. As the method for automatically setting the threshold, another known method may be used.

(vii) Step 326

The arithmetic unit 1051 performs the binarization process based on the threshold set in step 324, and stores the binary image into the storage unit 1053.

(viii) Step 328

The arithmetic unit 1051 extracts a feature of a black portion recognized as bacteria from the binary image. As the feature, the number of bacteria in the image, the area of the bacteria, the circumference of the bacteria, the roundness of the bacteria, the lengths of minor axis and major axis of the bacteria, the ratio between the minor axis and the major axis, and the like are calculated.

(ix) Step 330

The arithmetic unit 1051 calculates, from the same well, a new feature based on a time variation in the feature (feature of luminance value) extracted in step 312 and the feature (feature based on the binary image) extracted in step 328. As the new feature, a maximum value, a minimum value, a gradient, a difference in feature between two specific times, a time when the maximum value or the minimum value is obtained, and the like are calculated. These new features are also stored into the storage unit 1053. The measured data may be used as training data. It is possible to improve determination accuracy of the determiner 1055 by increasing volume of training data.

In the steps up to the feature extraction (step 300 to step 330), an image immediately after captured may be processed in real time, or a plurality of images may be collectively processed after measurement.

(x) Step 340

The determiner 1055 acquires the new feature from the arithmetic unit 1051 and outputs the determination result for each well. First, the determiner 1055 determines whether the growth of bacteria has occurred, using the feature of luminance value (statistical feature related to a luminance value). According to the present embodiment, a mean of luminance values is used as the statistical feature of luminance value. The mean of luminance values is calculated from the image captured at the preset determination time, and a difference from the mean of luminance values at an initial culture stage is calculated. Herein, the initial culture stage is about 0 to 1 hour after the start of culture. The threshold is set through learning using training data. When the growth of bacteria has occurred over the entire image, the growth of bacteria has developed even above the focused bottom surface. As the growth of bacteria develops, the amount of transmitted light decreases, so that the luminance values of the entire image get closer to black, and the mean of luminance values decreases accordingly. Therefore, when the mean of luminance values of the image decreases below a certain threshold, it is possible to reliably determine that the growth of bacteria has occurred. When the growth of bacteria has not occurred over the entire image, a change in mean of luminance values is very small, which prevents erroneous determination of the growth of bacteria.

(xi) Step 350

When an absolute value of the difference in mean of luminance values between the determination time and the initial culture stage is greater than the threshold, the determiner 1055 determines that the growth has occurred.

(xii) Step 360

On the other hand, when the difference in mean of luminance values is less than or equal to the threshold, the determiner 1055 determines that the growth has occurred or been inhibited based on the discriminant using the feature of bacteria. The discriminant is created from one or a plurality of features such as the maximum value of the number of bacteria or the area of bacteria, the gradient of the area of bacteria, the minimum value of the roundness, and the like as the feature of bacteria. For the discriminant, it is preferable to use a different feature depending on the antibacterial drug or bacterial species.

The use of a discriminant that highly coincides with the result of the method in the conventional technique allows an accurate and quick determination. As a result of the determination based on the discriminant, the result indicating the occurrence of growth (step 350) or the inhibition of growth (step 370) is output to the controller 106.

Subsequently, the result indicating the occurrence of growth or the inhibition of growth is obtained for each antibacterial drug concentration. Then, a minimum antibacterial drug concentration that has inhibited the growth is output as a minimum inhibitory concentration (MIC). Further, a determination is made as to whether the target bacteria are susceptible (S), intermediate (I), or resistant (R) to the antibacterial drug through comparison with a breakpoint table.

Measurement Example: Example 1

Figure 5:
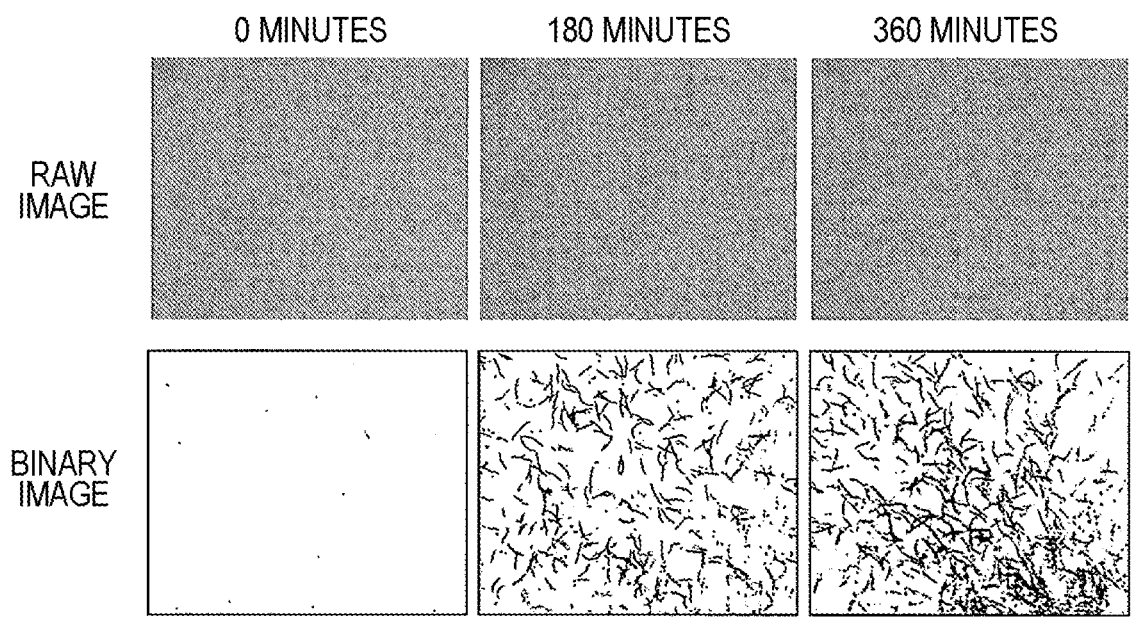
FIG. 5 is a diagram showing examples of raw images of bacteria and examples of images converted to binary by image processing steps 300 to 326.
Figure 6:
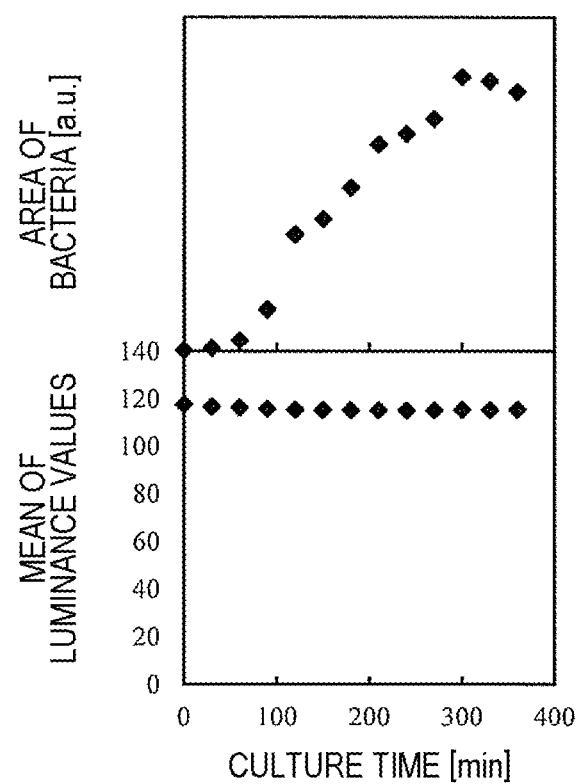
FIG. 6 is a diagram showing results of plotting an area of bacteria in images and a mean of luminance values as examples of feature.

FIG. 5 is a diagram showing examples of raw images of bacteria and examples of images converted to binary by image processing steps 300 to 326. In this measurement example, *Escherichia coli* was cultured in a medium containing ampicillin with concentration of 4 μg/mL and sulbactam with a concentration of 2 μg/mL, and an image was captured at 0 minutes, 180 minutes, and 360 minutes. Black portions in the binary images correspond to portions recognized as bacteria. Further, features were extracted in S312 and S328 from images captured every 30 minutes for 6 hours under the same conditions as in FIG. 5. FIG. 6 is a diagram showing results of plotting the area of bacteria in the images and the mean of luminance values as examples of feature. As shown in FIG. 6, the area of bacteria increases up to 300 minutes, but decrease afterward. On the other hand, the mean of luminance values varies little for 6 hours from the initial culture stage. Accordingly, the maximum area of bacteria or the gradient at each measurement time is calculated as an example of feature based on a time variation in step 330. For example, when the determination time is 6 hours, the maximum value of the area of bacteria at 6 hours, the gradient obtained from the area of bacteria at 6 hours and the area of bacteria immediately before 6 hours, the difference in mean of luminance values between at 6 hours and at 0 hours, and the like are calculated.

It is determined whether the growth has occurred or been inhibited, using such features in accordance with the determination steps S340 and S350. In FIG. 4 and FIG. 5, the absolute value of the difference in mean of luminance values is 2.2 that is equal to or less than the threshold, and therefore it is determined that the growth has not occurred, and the process proceeds to the determination step S360. Then, the above-described maximum value of the area of bacteria and the gradient are input to the determiner for determining whether the growth has occurred or been inhibited. The result of the determination showed the inhibition of growth. The result of the determination, under the method in the conventional technique, obtained based on turbidity after 18 hours showed the inhibition of growth that is the same as the result obtained from images.

Figure 7:
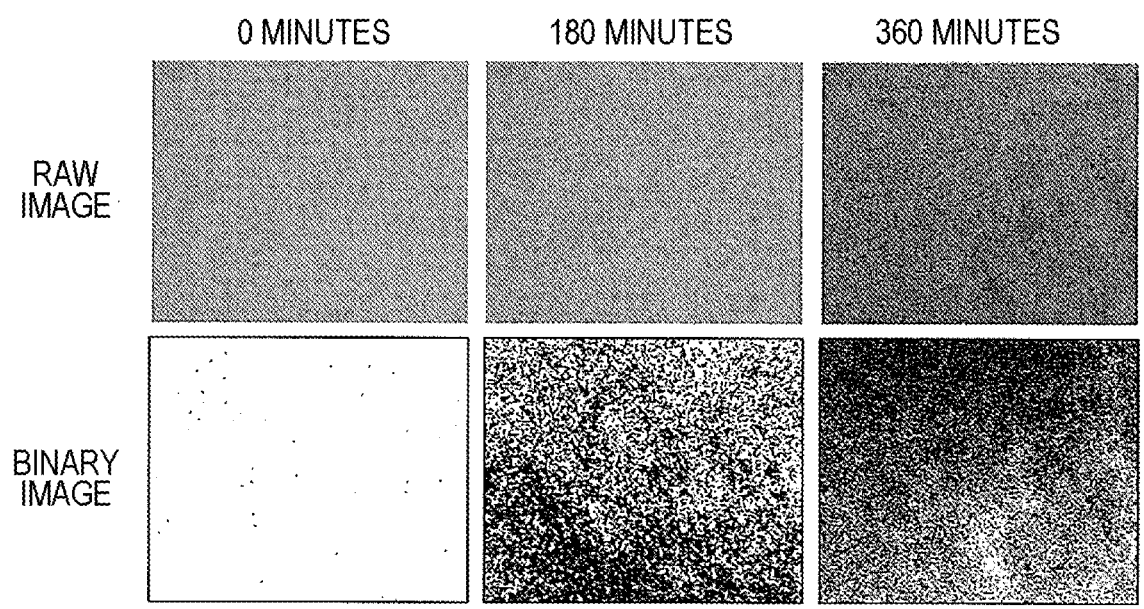
FIG. 7 is a diagram showing images captured at 0 minutes, 180 minutes, and 360 minutes for which *Escherichia coli* has been cultured in a medium containing ampicillin with a concentration of 1 μg/mL and sulbactam with a concentration of 0.5 μg/mL.
Figure 8:
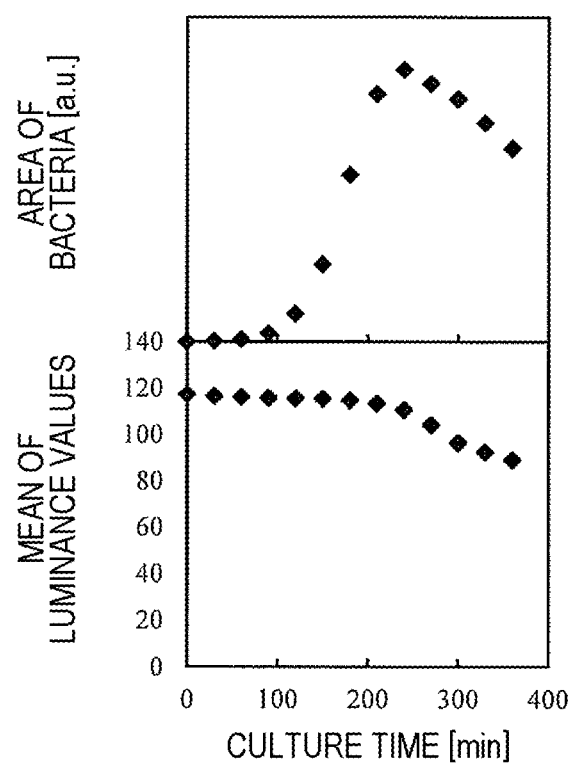
FIG. 8 is a diagram showing results of plotting, based on images captured every 30 minutes for 6 hours under the same conditions as in FIG. 7, the area of bacteria in the images and the mean of luminance values.

On the other hand, FIG. 7 is a diagram showing images captured at 0 minutes, 180 minutes, and 360 minutes for which *Escherichia coli* has been cultured in a medium containing ampicillin with a concentration of 1 μg/mL and sulbactam with a concentration of 0.5 μg/mL. Further, FIG. 8 is a diagram showing results of plotting, using images captured every 30 minutes for 6 hours under the same conditions as in FIG. 7, the area of bacteria in the images and the mean of luminance values. As shown in FIG. 8, a time variation in the area of bacteria starts to increase at around 120 minutes. At 240 minutes, the area of bacteria reaches a maximum value, and then starts to decrease. Then, since the absolute value of the difference in mean of luminance values at 270 minutes exceeds the threshold, it is determined that the growth has occurred in step 340 described above. The result under the method in the conventional technique based on turbidity after 18 hours also showed that the growth has occurred, and therefore the determination results under both the determination methods were in agreement with each other.

As described above, the use of the mean of luminance values allows a determination of the occurrence of growth of bacteria with high accuracy. When no luminance value was used, the area of bacteria apparently decreased, and then determinations after 270 minutes showed the inhibition of growth. However, it is possible to correctly determine that the growth has occurred based on the mean of luminance values. Further, the use of the mean of luminance values of each pixel allows a determination that the growth has occurred without the process of dividing the image into a plurality of segments and binarizing the image, so that the calculation time and cost can be reduced. Therefore, it is possible to determine whether the growth of bacteria has occurred or been inhibited in a quick and real-time manner.

Figure 9:
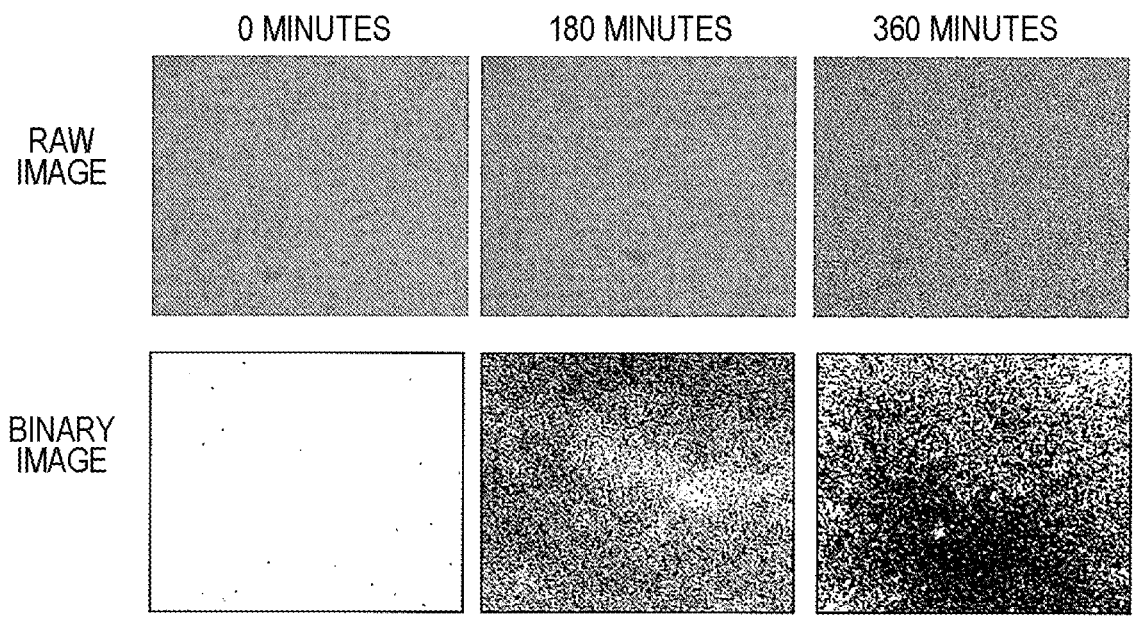
FIG. 9 is a diagram showing microscopic images captured at 0, 180, and 360 minutes for which *Escherichia coli* has been cultured in a medium containing cefoxitin with a concentration of 2 μg/mL.
Figure 10:
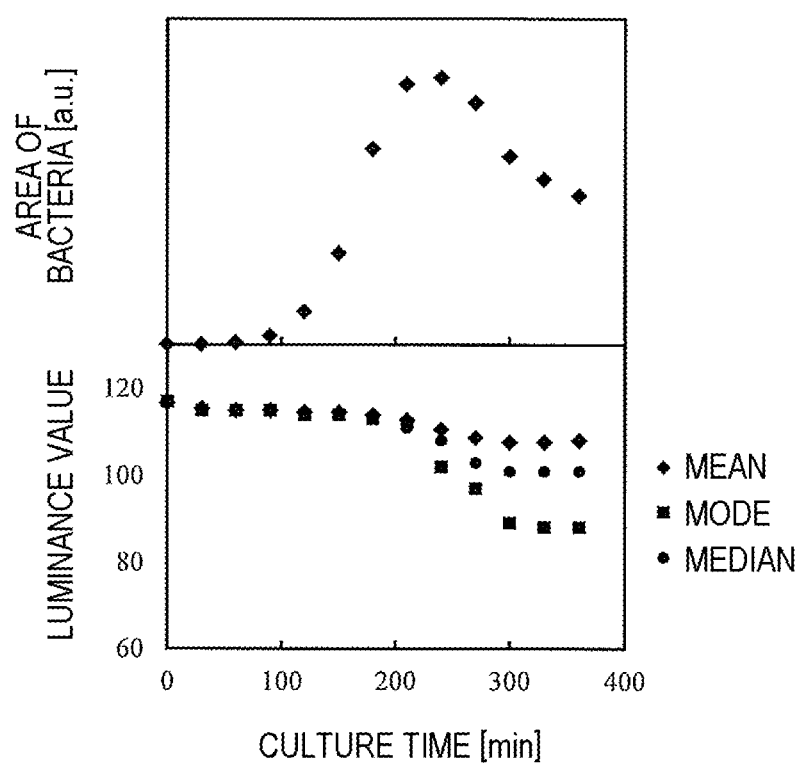
FIG. 10 is a diagram showing results of plotting changes in the mean, median, and mode of luminance values based on the images shown in FIG. 9.

Note that, for the determination based on the luminance values, a mode or a median rather than the mean may be used. Even when a determination is made based on the mode or median, the same effect as the determination based on the mean can be obtained. FIG. 9 is a diagram showing microscope images captured at 0, 180, and 360 minutes for which *Escherichia coli* has been cultured in a medium containing cefoxitin with a concentration of 2 µg/mL. Further, FIG. 10 is a diagram showing results of plotting changes in the mean, median, and mode of luminance values based on the images shown in FIG. 9. Even in the same images, an amount of change varies in a manner that depends on the feature, and the mode shows the largest change. For example, the use of a β-lactam antibacterial drug or the like may cause some bacteria to look white in an image, which is particularly noticeable in the image captured at 360 minutes shown in FIG. 9. In such a case, the amount of change in mean or median of luminance values becomes smaller as compared with the initial culture stage. On the other hand, it is understood that the use of the mode reduces such an influence. The mode at the initial culture stage represents a luminance value of a medium portion serving as a background because the number of bacteria is small. When the growth of bacteria has occurred over the entire image, the medium portion disappears, and a bacteria portion that is different in luminance value occupies most of the image. Although some bacteria look white in an image, most of the bacteria look black in the image, and the mode decreases accordingly. Therefore, it becomes to detect the occurrence of growth quickly and reliably.

Second Embodiment

The second embodiment discloses an embodiment where the minimum filter is applied to the image of each well, and the occurrence of growth of bacteria is determined more quickly based on a time variation in luminance value of each image.

A bacteria test apparatus according to the second embodiment may be the same in structure (example) as the bacteria test apparatus 100 (see FIG. 2) according to the first embodiment.

Figure 11:
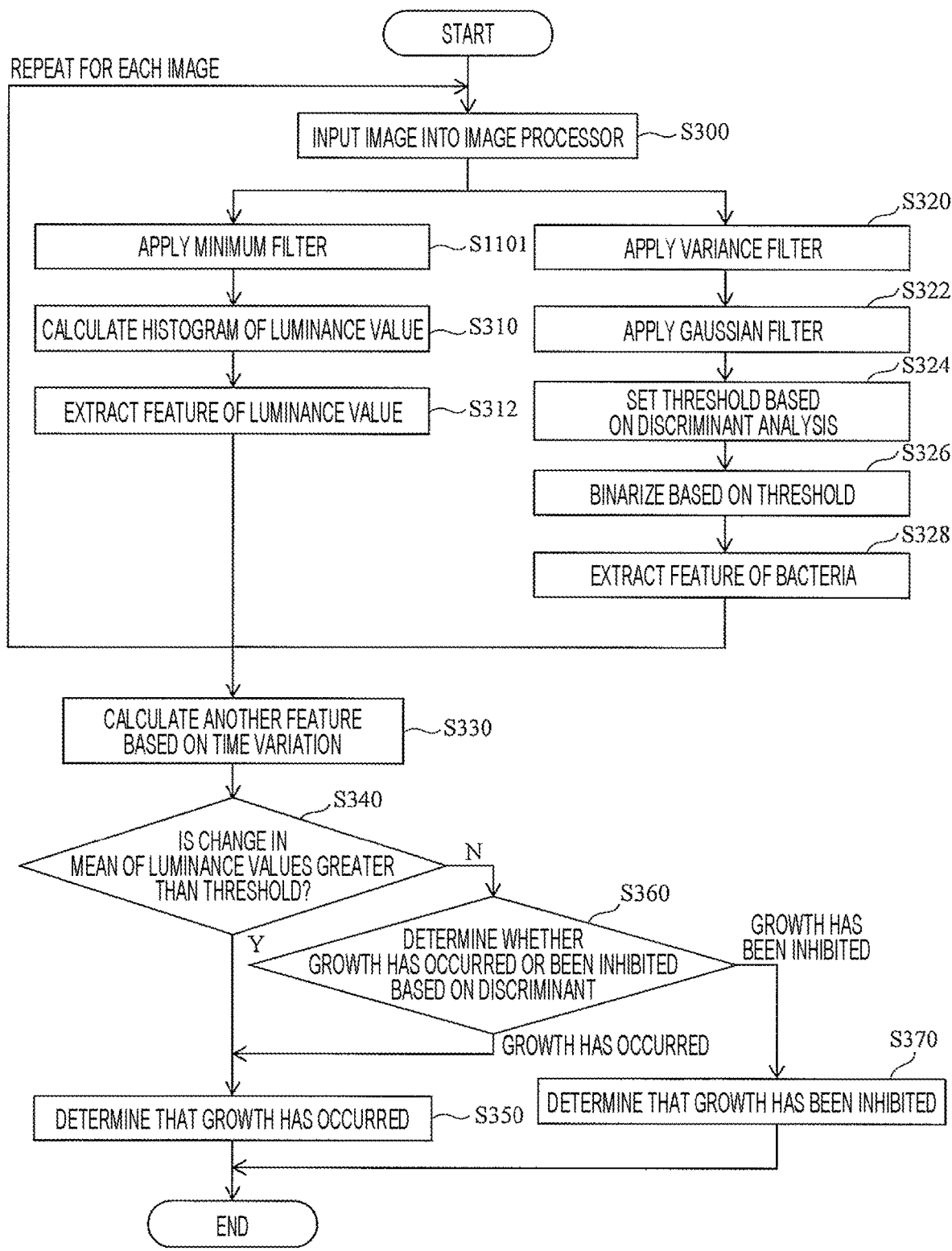
FIG. 11 is a flowchart for describing image processing to be performed by a bacteria test apparatus according to a second embodiment.

FIG. 11 is a flowchart for describing image processing to be performed by the bacteria test apparatus according to the second embodiment. In FIG. 11, no detailed description will be given of components denoted by the same reference numerals as shown in FIG. 4.

In FIG. 11, a difference from the processing according to the first embodiment is the addition of step 1101 to the processing shown in FIG. 4. That is, according to the second embodiment, step 1101 of applying the minimum filter to an image is added before the calculation of the histogram of luminance value (step 310).

The application of the minimum filter in step 1101 is a process of replacing the luminance value of the pixel of interest with the minimum value of the surrounding pixels. This has the effect of enhancing edges of bacteria thickly. Then, after the application of the minimum filter, the histogram of luminance value is calculated, and the feature of luminance value is extracted. With this processing, it is possible to enhance the amount of change in feature in a case where the minimum filter is applied as compared with a case where the minimum filter is not applied. Accordingly, it becomes possible to determine the occurrence of growth of bacteria more quickly.

Measurement Example: Example 2

Figure 12:
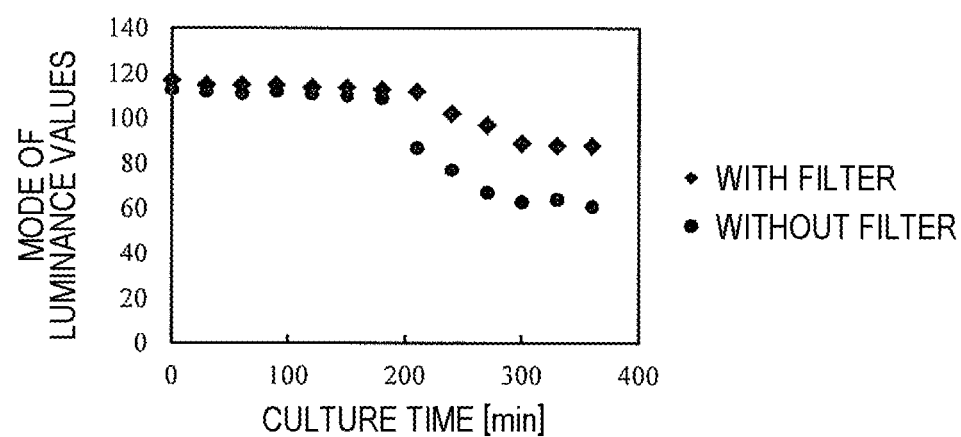
FIG. 12 is a diagram showing a result of comparing a change in mode of luminance values when a 3-by-3 minimum filter is applied to the images shown in FIG. 9 and a change in mode of luminance values when the minimum filter is not applied.

FIG. 12 is a diagram showing a result of comparing a change in mode of luminance values when a 3-by-3 minimum filter is applied to the images shown in FIG. 9 and a change in mode of luminance values when the minimum filter is not applied.

As shown in FIG. 12, the addition of the application of the minimum filter causes the mode of luminance values to change more greatly. Accordingly, it is possible to determine the occurrence of growth more quickly. In this case, the application of the minimum filter allows the growth of bacteria to be determined at least 30 minutes earlier.

Figure 13:
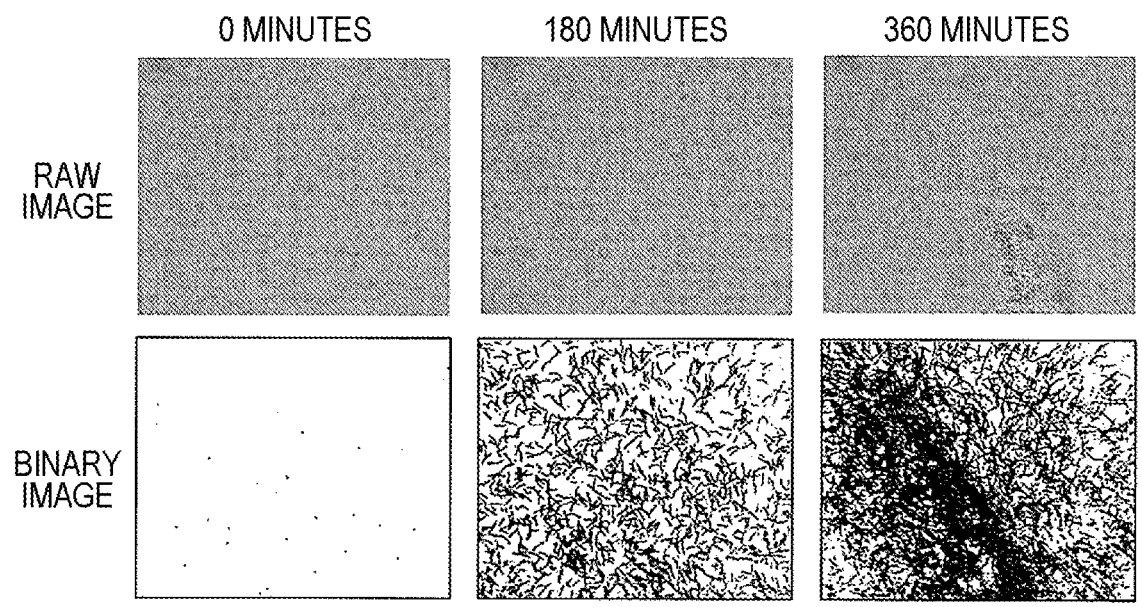
FIG. 13 is a diagram showing microscopic images captured at 0 minutes, 180 minutes, and 360 minutes for which *Escherichia coli* has been cultured in a medium containing ampicillin with a concentration of 2 μg/mL.
Figure 14:
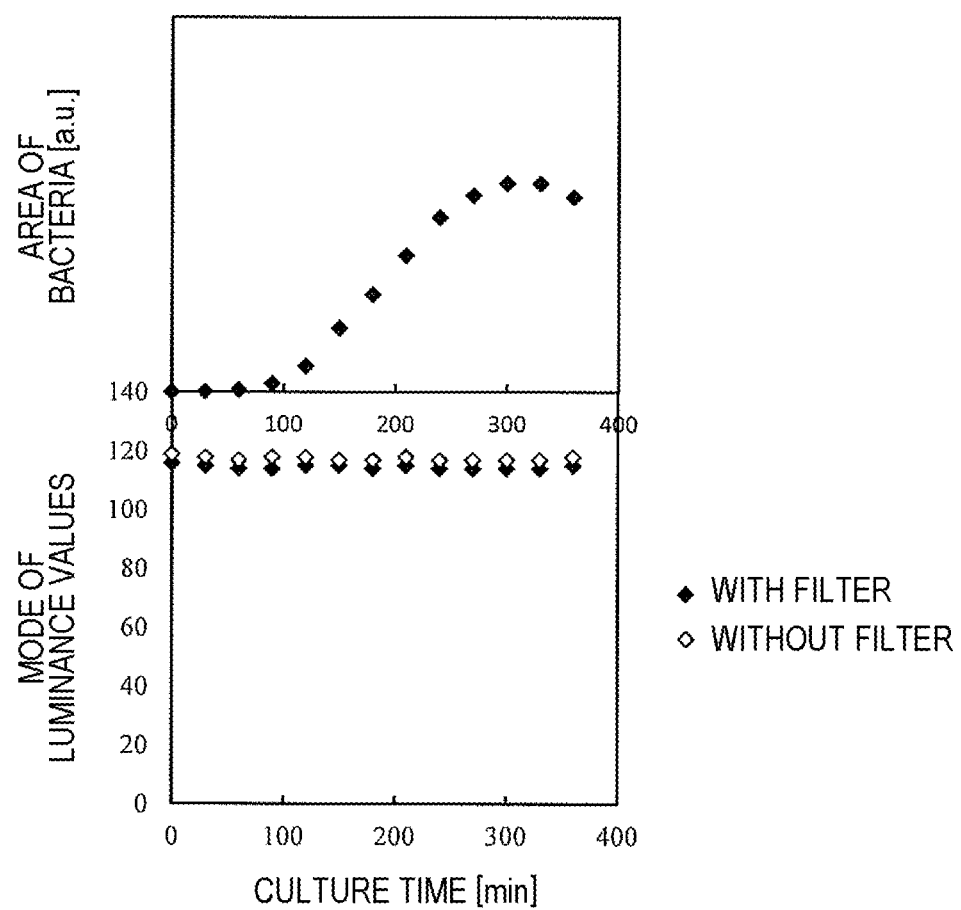
FIG. 14 is a diagram showing a time variation in area of bacteria under the same conditions as in FIG. 13 and time variations in mode of luminance values with and without the application of the minimum filter.

FIG. 13 is a diagram showing microscopic captured at 0 minutes, 180 minutes, and 360 minutes for which *Escherichia coli* has been cultured in a medium containing ampicillin with a concentration of 2 µg/mL. FIG. 14 is a diagram showing a time variation in area of bacteria under the same conditions as in FIG. 13 and time variations in mode of luminance values with and without the application of the minimum filter. As shown in FIG. 14, when the growth of bacteria has not occurred over the entire image, the mode of luminance values does not vary regardless of with or without the minimum filter. Therefore, since the application of the minimum filter prevents erroneous detection of the growth of bacteria, it is possible to maximize the merit of the application of the minimum filter (enhancement of the amount of change in feature).

Third Embodiment

The third embodiment discloses an embodiment where a growth curve of bacteria after the growth of the bacteria has occurred over the entire image is estimated from a change in luminance value.

A bacteria test apparatus according to the third embodiment may also be the same in structure (example) as the bacteria test apparatus 100 according to the first embodiment (see FIG. 2). Further, in the bacteria test apparatus 100 according to the third embodiment, after the image processing (see FIG. 4) according to the first embodiment, a process of estimating the growth curve of bacteria (see FIG. 15) is performed. No detailed description will be given of the components denoted by the same reference numerals as shown in FIG. 2 and FIG. 4.

<Necessity of Process of Estimating Growth Curve of Bacterial>

In a typical bacteria test apparatus, once the growth of bacteria has occurred over the entire image, whether further growth of bacteria has occurred cannot be detected. Further, when a user confirms, with the controller 106, the growth curve of bacteria with reference to the area of bacteria, a decrease in area of bacteria due to the influence of automatic binarization makes it difficult to intuitively determine whether the growth of bacteria has occurred. For this reason, it is desirable to allow a determination as to whether the growth has occurred recently even with a decrease in area of bacteria.

Therefore, the present embodiment proposes estimating the growth curve from a combination of the luminance value and the feature of bacteria.

<Process of Estimating Growth Curve of Area of Bacteria>

Figure 15:
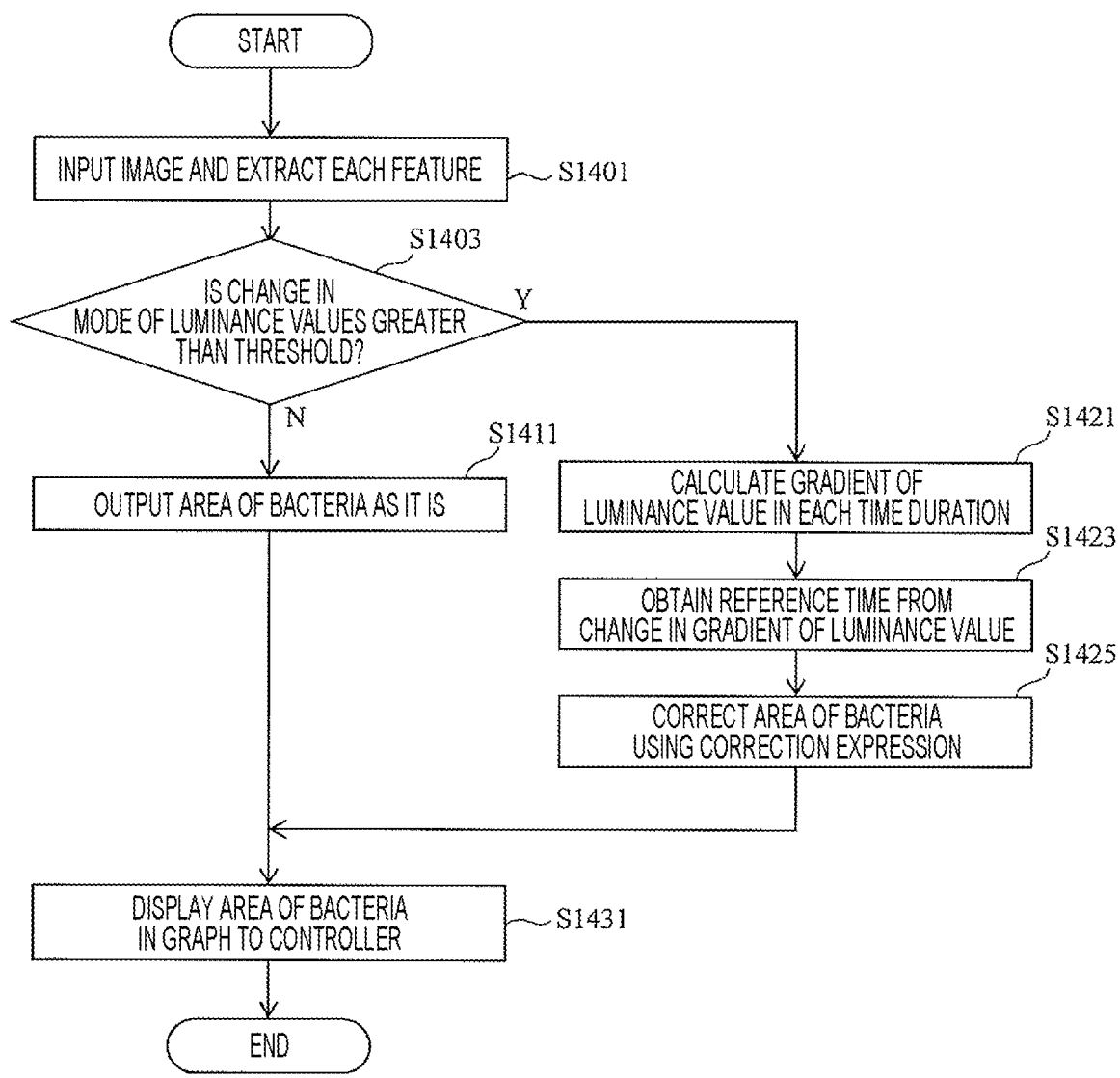
FIG. 15 is a flowchart for describing processing of estimating a growth curve from the area of bacteria based on the area of bacteria and luminance values.

According to the present embodiment, the growth curve of the area of bacteria is estimated from a combination of the mode of luminance values and the area of bacteria. FIG. 15 is a flowchart for describing the process of estimating the growth curve of the area of bacteria based on the area of bacteria and the luminance value. A description will be given below of the process of estimating the growth curve of the area of bacteria.

(i) Step 1401

The image processor 105 calculates each feature (the mode of luminance values and the feature after the most recent detection) from an input image based on the image processing shown in FIG. 4.

(ii) Step 1403

The image processor 105 determines whether the absolute value of a difference in mode of luminance values between an image captured at the initial culture stage and an image captured at a certain time exceeds a preset threshold. When the absolute value of the difference in mode of luminance values is equal to or less than the threshold, the process proceeds to step 1411. When the absolute value of the difference in mode of luminance values is greater than the threshold, the process proceeds to step 1421. When the absolute value of the difference in mode of luminance values is greater than the threshold, a determination is made that the number of bacteria detected is less than the actual number of bacteria. The preset threshold may be set through learning using training data, for example.

(iii) Step 1411

When the absolute value of the difference in mode of luminance values is equal to or less than the threshold, the image processor 105 uses the area of bacteria extracted as it is.

(iv) Step 1421

When the absolute value of the difference in mode of luminance values exceeds the threshold, the image processor 105 calculates the gradient of the mode of luminance values at each time from the images captured of the same well. Note that, since it is obvious that the number of bacteria is small at the initial culture stage (0 to 1 hour), the gradient is not calculated.

(v) Step 1423

The image processor 105 sets, as a reference time, a time at which the gradient changes by at least a certain amount relative to the gradient between the initial culture stage and the next image-capture time (for example, the gradient of the mode of luminance values between 1 hour and 1.5 hours). For example, a time at which the gradient becomes equal to or greater than 10 times the gradient at the initial culture stage is set as the reference time.

(vi) Step 1425

The image processor 105 corrects the area of bacteria after the reference time using a correction expression shown in Expression (1).

$$A'_T = -k^*(L_T - L_0)^* s + A_{T0} \quad (1)$$

In Expression (1), with a gradient of the area of bacteria between the reference time T0 and the time immediately before the reference time T0 denoted by s, an area of bacteria at the reference time T0 denoted by $A_{T0}$, a mode of luminance values at the current time T denoted by $L_T$, a mode of luminance values at the reference time denoted by $L_{T0}$, and a proportional constant unique to the feature of luminance value denoted by k, an area of bacteria after correction $A'_T$ is estimated. That is, it is assumed that the area of bacteria can be detected almost accurately until the reference time, and it is considered that the area of bacteria is in the logarithmic growth phase even immediately after the reference time. Accordingly, the growth curve is estimated on the assumption that bacteria grows at an almost constant growth rate. Since the subsequent growth rate of bacteria is considered to be approximately proportional to the amount of change from the luminance value at the reference time, the area of bacteria is estimated by multiplying the difference in luminance value by the gradient. When the growth of bacteria is saturated and the stationary phase is reached, the growth rate of bacteria decreases, and the amount of change in luminance value decreases accordingly.

(vii) Step 1431

The image processor 105 outputs the change in area of bacteria to the controller 106. The controller 106 displays the growth curve created on a display screen of the display device. This allows the user to confirm the growth curve.

Measurement Example: Example 3

Figure 16:
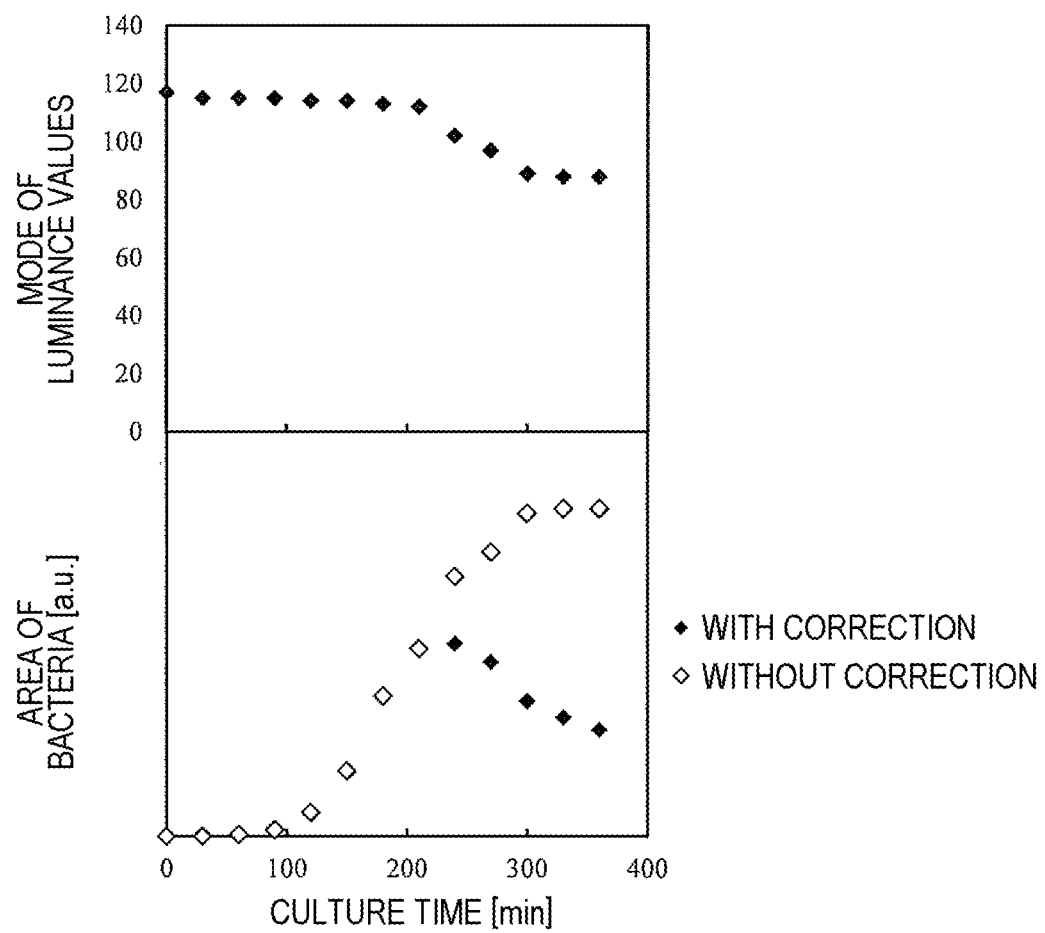
FIG. 16 is a diagram showing a time variation in mode of luminance values, a time variation in area of bacteria before correction, and a time variation in area of bacteria after correction based on the images (captured every 30 minutes) shown in FIG. 9.

FIG. 16 is a diagram showing time variations in mode of luminance values, area of bacteria before correction, and area of bacteria after correction based on the images (captured every 30 minutes) shown in FIG. 9.

First, since the absolute value of the amount of change in mode of luminance values is less than the threshold value up to 240 minutes, the area of bacteria up to 240 minutes is output as it is. Next, the gradient of the mode of luminance values in each time duration after 60 minutes is calculated. In this case, the gradient of the mode of luminance values between 60 minutes and 90 minutes is used as a reference, and 210 minutes when a change in gradient becomes equal to or greater than 10 times is set as the reference time. Therefore, the area of bacteria after 240 minutes is corrected with 210 minutes as the reference time. Herein, although the area of bacteria at 240 minutes is once output, the mode of luminance values exceeds the threshold at 270 minutes, and therefore the area of bacteria is corrected retroactively. That is, the area of bacteria is output as it is after image capture at 240 minutes, but the area of bacteria is corrected after image capture at 270 minutes. This allows only a decrease in area of bacteria due to the influence of the binarization process to be corrected.

For the correction of the area of bacteria after 240 minutes, the gradient between 180 minutes and 210 minutes, and the area of bacteria $A_{T0}$ at 210 minutes that is the reference time were used. The corrected growth curve shown in FIG. 16 was obtained using the correction expression (the above-described Expression (1)). Accordingly, the growth curve of the area of bacteria can be estimated from a combination with the mode of luminance values, and the growth state of bacteria can be displayed in a visually clear manner. Further, when the growth of bacteria has occurred over the entire image, it is difficult to estimate the growth state only from the image, but the use of the luminance value makes it possible to estimate whether the growth of bacteria has occurred afterward.

SUMMARY (i) Each of the embodiments discloses a corresponding bacteria test apparatus that conducts the bacteria identification test and the antibacterial susceptibility test. The bacteria test apparatus includes a microscope optical system which captures images of bacteria in each of a plurality of wells at a plurality of time points, the plurality of wells each holding a culture solution containing an antibacterial drug and the bacteria, an arithmetic unit which calculates a feature of luminance value for each of the images of the bacteria, a determination unit which determines whether growth of the bacteria has occurred in the wells based on a change in the feature of luminance value, and a display device which displays a determination result output from the determination unit. Herein, the arithmetic unit calculates, as the feature of luminance value, a feature including at least one of a mean, a median, or a mode. Conventionally, a determination as to whether the growth of bacteria has occurred or been inhibited is made based on the feature of shape of bacteria (at least one of the area of the bacteria, the circumference of the bacteria, the roundness of the bacteria, or the number of the bacteria), but, according to the present embodiment, a determination as to whether the growth of bacteria has occurred is made based on the feature of luminance value, so that it is possible to reliably and accurately detect the growth of bacteria.

According to the present embodiment, in addition to the feature of luminance value of the image of the bacteria, a feature of shape of the bacteria in the image of the bacteria is acquired, and a determination as to whether the growth of bacteria has occurred or been inhibited is made based on a plurality of combinations of the feature of luminance value and the feature of shape. In this way, the determination of the growth of bacteria based on the feature of shape of bacteria is performed in a supplementary manner, allowing quick detection of the occurrence and inhibition of growth of bacteria.

According to the second embodiment, the minimum filter is applied to the images of the bacteria to enhance edges of the bacteria, and then the feature of luminance value is calculated. This allows the amount of change in feature of luminance value to be enhanced, thereby allowing quick detection of the occurrence of growth of bacteria.

According to the third embodiment, the growth curve of the bacteria is estimated by correcting a time variation in the area of the bacteria based on a time variation in the feature of luminance value, and the display device is caused to display the growth curve of the bacteria thus estimated. This allows, even when the area of bacteria decreases due to the influence of automatic binarization, an accurate determination as to whether the growth of bacteria has occurred.

(ii) The present disclosure is not limited to the above-described embodiments nor examples, and various modifications fall within the scope of the present disclosure. The descriptions of the above embodiments and examples have been given in detail in order to facilitate the understanding of the present disclosure, and the present invention is not necessarily limited to an embodiment having all the configurations described above. Further, part of the configuration of one example may be replaced with the configuration of another embodiment, and the configuration of another embodiment may be added to the configuration of one embodiment. Further, with respect to part of the configuration of each of the examples, it is possible to add, delete, and replace the other configuration.

REFERENCE SIGNS LIST

100 bacteria test apparatus
101 illuminator
102 test plate
103 objective lens
104 imager
105 image processor
106 controller

The invention claimed is:

1. A bacteria test apparatus that identifies bacteria and conducts an antibacterial susceptibility test, the bacteria test apparatus comprising:
   a microscope optical system which captures for each of a plurality of wells holding a culture solution containing an antibacterial drug and the bacteria undergoing the antibacterial susceptibility test, a plurality of images of the well including the bacteria at a plurality of time points;
   a processor which calculates, for each of the plurality of wells, a feature of luminance value for each of the images, and determines, for the each of the plurality of wells, whether growth of the bacteria has occurred in the plurality of wells based on a temporal change in the feature of luminance value, wherein the processor calculates statistical features comprising mean luminance values from the images at preset times, calculates differences from mean luminance values at initial culture stage, and estimates growth curves based on corrected time variation in bacteria area with assumption of constant growth rate; and
   a display device which displays a determination result output based on the calculation and determination by the processor,
   wherein the calculation includes at least one of a mean, a median, or a mode of the luminance values of an entire image of the well, and
   whether the growth of the bacteria has occurred based on a combination of the mode of luminance values and an area of the bacteria, by correcting a time variation in the area of the bacteria based on a time variation in the feature of luminance value.

2. The bacteria test apparatus according to claim 1, wherein
   a feature of shape including at least one of an area of the bacteria in the images of the bacteria, roundness of the bacteria, a circumference of the bacteria, or a number of the bacteria, is acquired by the bacteria test apparatus in addition to the feature of luminance value of the images of the bacteria, and
   whether growth of the bacteria has occurred or been inhibited is determined based on a plurality of combinations of the feature of luminance value and the feature of shape.

3. The bacteria test apparatus according to claim 1, wherein
a minimum filter is applied to the images of the bacteria to enhance edges of the bacteria, and calculates the feature of luminance value.

4. The bacteria test apparatus according to claim 1, wherein
the display device is configured to display the growth curves of the bacteria estimated.

5. A bacteria test method for identifying bacteria and conducting an antibacterial susceptibility test, the bacteria test method comprising:
capturing by use of a microscopic optical system, and for each of a plurality of wells each holding a culture solution containing an antibacterial drug and the bacteria undergoing the antibacterial susceptibility test, a plurality of images of the well including the bacteria at a plurality of time points;
processing, by a processor, the plurality of images to calculate, for each of the plurality of wells, a feature of luminance value for each of the images, and to determine, for the each of the plurality of wells, whether growth of the bacteria has occurred in the plurality of wells based on a temporal change in the feature of luminance value, wherein the processing includes calculating statistical features comprising mean luminance values from the images at preset times, calculating differences from mean luminance values at initial culture stage, and estimating growth curves based on corrected time variation in bacteria area with assumption of constant growth rate; and
displaying, by a display device, a determination result output based on the calculation and determination by the processor.

6. The bacteria test method according to claim 5, further comprising:
acquiring a feature of shape including at least one of an area of the bacteria in the images of the bacteria, roundness of the bacteria, a circumference of the bacteria, or a number of the bacteria; and
determining whether growth of the bacteria has occurred or been inhibited based on a plurality of combinations of the feature of luminance value and the feature of shape.

7. The bacteria test method according to claim 5,
further comprising applying a minimum filter to the images of the bacteria to enhance edges of the bacteria, and calculating the feature of luminance value.

8. The bacteria test method according to claim 5, further comprising:
displaying, by the display device, the growth curves of the bacteria estimated.

* * * * *